Oct. 17, 1967   J. D. HINKE   3,347,108
REVERSE IDLER DRIVE AND INTERLOCK
Filed April 26, 1965   4 Sheets-Sheet 1
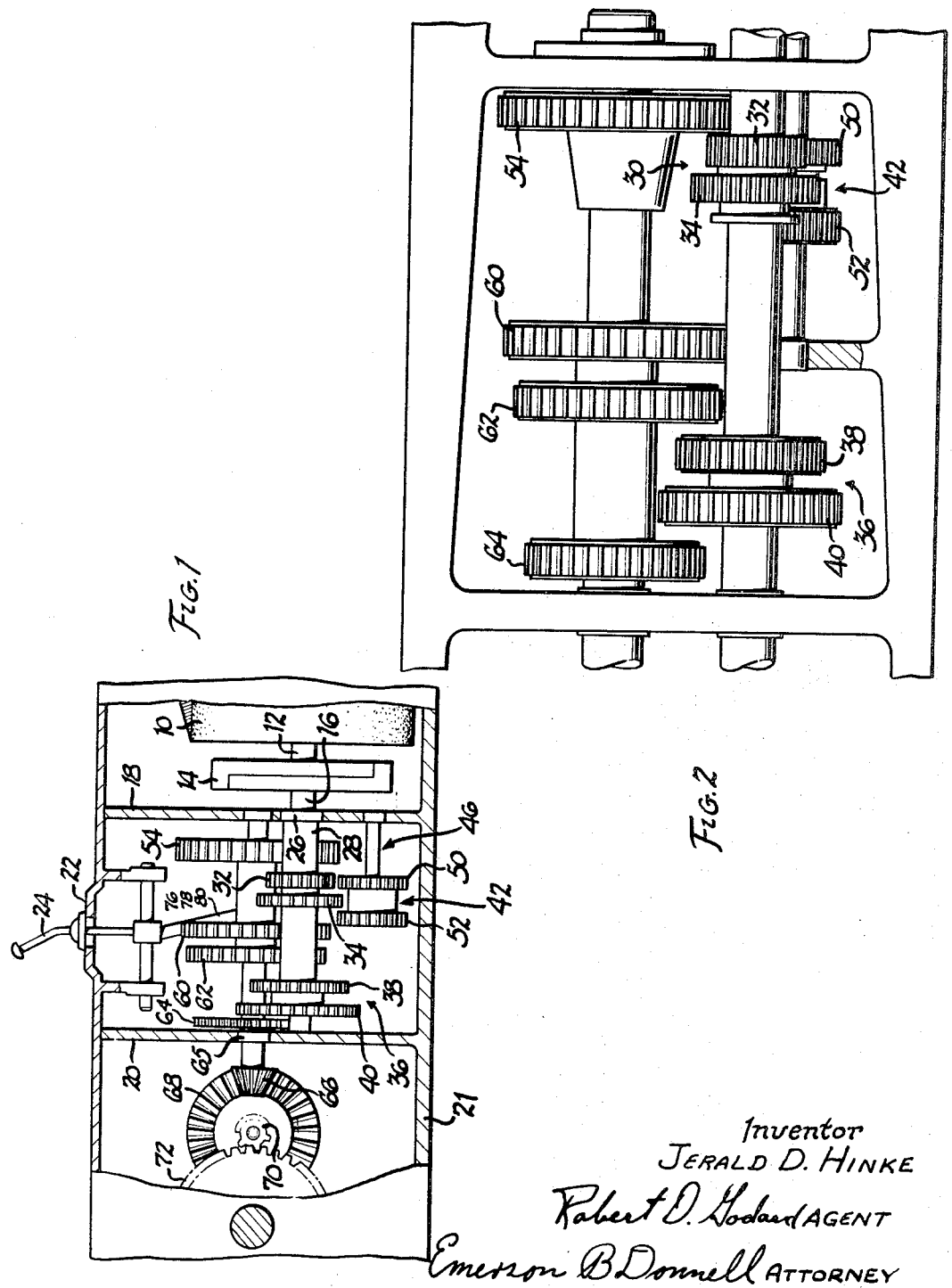
Inventor
JERALD D. HINKE
Robert D. Godard AGENT
Emerson B Donnell ATTORNEY

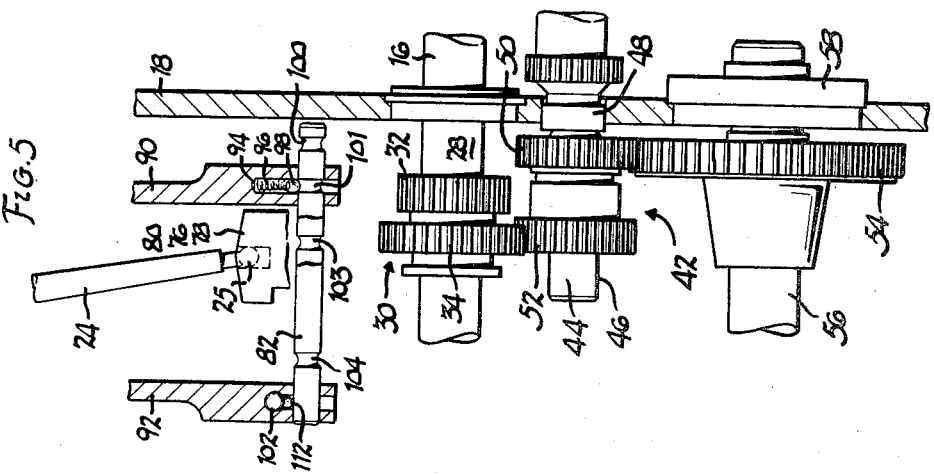
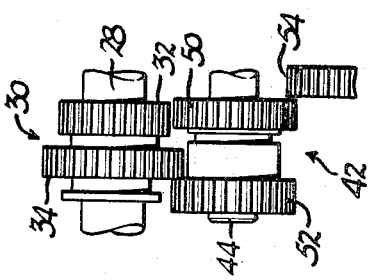
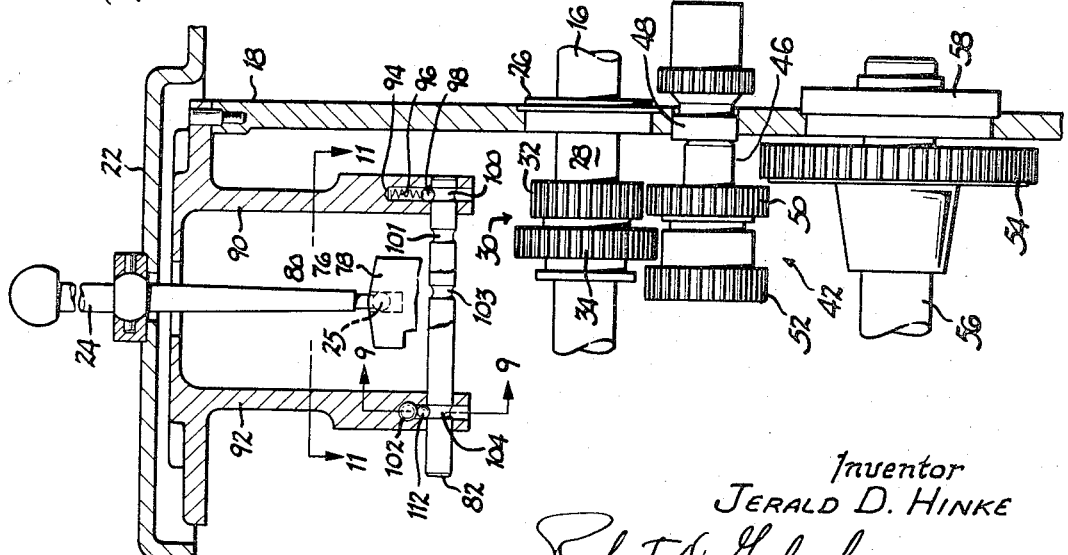

Inventor
JERALD D. HINKE
Robert O. Godard AGENT
Emerson B Donnell ATTORNEY

United States Patent Office 3,347,108
Patented Oct. 17, 1967

3,347,108
REVERSE IDLER DRIVE AND INTERLOCK
Jerald D. Hinke, Racine, Wis., assignor to J. I. Case Company, Racine, Wis., a corporation of Wisconsin
Filed Apr. 26, 1965, Ser. No. 450,896
6 Claims. (Cl. 74—342)

ABSTRACT OF THE DISCLOSURE

A transmission having driving and driven shafts with gears thereon for effecting a smooth engagement of the gears when changing the direction of travel. A sliding gear unit and a reversing idler gear unit are positioned on their respective shafts for delayed engagement of the idler gear with the driven gear when the transmission is changed from neutral position to a reverse drive position. A shifting mechanism is provided which includes interlocks in the form of a slidable rail and ball means for positively controlling the shift rails and the sliding and idler gear units.

The present invention relates to tractor transmissions and particularly to the reverse idler drive in a transmission. A reverse idler drive is commonly used in a transmission for the purpose of achieving reverse rotation of a shaft which will change the direction of travel of the tractor, and which is done by shifting certain gears. In many transmission designs, a reverse idler gear is provided which is constantly turning when the engine is running, when the gear shift is in a neutral position, and when the clutch is engaged with the engine drive shaft. The clutch is used to engage and disengage the drive train from the flywheel and the engine crankshaft.

As is commonly known, there is a certain amount of audible noise when two gears are meshing and turning on their respective shafts. While this audible noise does not harm the operation of the transmission, improvements can be made to eliminate or minimize the sound of meshing gear teeth. One way of eliminating the sound from the meshing gear teeth would be to provide a reverse idler drive which would be disengaged and thus would not turn when the engine was running, when the gear shift was in a neutral position, and when the clutch was engaged. When the gear shift is moved into a forward or a reverse drive position, and the tractor is moving, the sound of the gears would not be objectionable because the noise from the engine would overcome the sound from the meshing teeth in the transmission.

Prior gear arrangements had driving or sliding gears in constant mesh with the reverse idler drive so there was no problem of meshing these gears when desiring to shift into reverse speed. However, when shifting into reverse speed, the reverse idler drive gear had to mesh with a driven gear to move the tractor in reverse direction. In this operation, it may have been possible to accidentally mesh the reverse idler gear with both a forward and a reverse driven gear at the same time, and thus block the motion. In normal operation, if the reverse idler gear did not mesh with a driven gear, the operator could, by momentarily engaging the clutch, move the idler gear teeth into a new position so that these teeth would properly mesh with the driven gear.

An improvement in the reverse idler drive was desired to eliminate the sound resulting from the constant mesh arrangement. However, disengaging the idler gear to eliminate its sound requires reengaging it when it is desired to drive in the reverse direction, and increases the possibililty of engaging both a forward and a reverse drive at the same time. To further make certain that the above-mentioned situation does not occur, other safeguards have been provided.

The present invention is an improvement in the reverse idler drive, and the principal object of the invention is to provide a reverse idler drive which will eliminate the audible noise from the transmission when the shift lever is in the neutral position.

A further object is to provide a reverse idler drive which will facilitate meshing the driving gear with the driven gear.

An additional object is to provide an interlock which will insure that the transmission gears cannot be meshed in both a forward and a reverse speed position at the same time. In other words, a double engagement of the gears is prevented.

Further objects and advantages will be apparent from the following specification, and the annexed drawings, in which:

FIGURE 1 is a side elevation partly diagrammatic in character of so much of a tractor as necessary to illustrate the invention, parts being broken away to show what lies beneath, and others being omitted to avoid complication of the drawing;

FIG. 2 is an enlarged plan view of a transmission showing the invention, parts being broken away and others omitted to avoid complication of the drawing;

FIG. 3 is a development of the mechanism or side elevation of the mechanism in a neutral position, vertically extended to show the parts fully exposed;

FIG. 4 is a side elevation of the mechanism, parts broken away to show the position of the gears at the start of the reverse speed position;

FIG. 5 is a side elevation similar to FIG. 3, in the reverse speed position;

Figure 6:
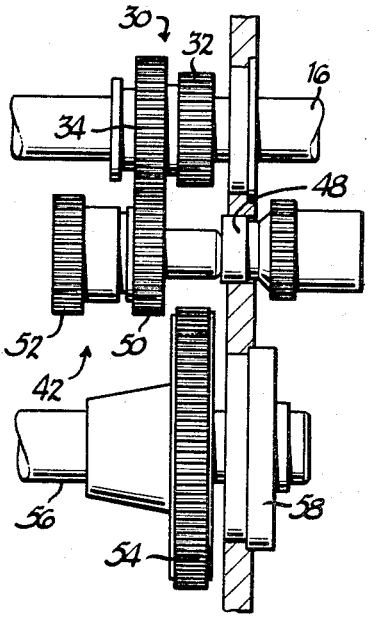
FIG. 6 is a side elevation similar to FIGS. 3 and 5 of the device in the forward speed position.

As seen in FIG. 1, the transmission is driven from an engine 10 through an engine crankshaft 12, a clutch mechanism 14 and a drive shaft 16, the clutch mechanism being a commonly used type which engages and disengages the shaft 16 from the engine crankshaft and the flywheel at will. The engine flywheel and the clutch mechanism are separated from the transmission by a forward wall 18. The transmission is separated from the differential gears and the rear axle by a rear wall 20. Walls 18 and 20 form a part of a transmission case 21. The top of the transmission has a cover plate 22 on case 21 from which a shift lever 24 extends into the case and has a ball portion 25 to engage certain transmission parts which will be described later. As shown in FIGS. 1 and 3, shaft 16 is journaled at 26 in the forward wall 18, and is connected to a portion 28 on which a sliding gear unit 30 moves back and forth.

Drive shaft 16 is so constructed that gear unit 30 slides but does not rotate on the shaft. Gear unit 30 has a forward or first gear portion 32 and a rear or second gear portion 34 which are connected together so that both portions of gear unit 30 slide either forward or backward at the same time. A similar sliding gear 36 of well-known type is mounted on the rear portion of the shaft 16 for obtaining additional forward speeds. The rear portion of shaft 16 is also constructed so that gear 36 can slide back and forth on the shaft. Gear 36 has a forward portion 38 and a rear portion 40 which are united so that both portions travel forward or rearward at the same time.

Located adjacent gear 30 is an idler gear unit 42 which is shifted by the shift lever 24 into a position which will change the direction of travel. Gear unit 42 is slidably journaled on a portion 44 of a shaft 46. Shaft 46 is supported at 48 in wall 18. Gear unit 42 has a forward or first idler gear 50, and a rear or second idler gear 52. First idler gear 50 and second idler gear 52 are united so that both gears slide forward or rearward at the same time. Gear unit 42 is termed a reverse idler because it is used to mesh with driving and driven gears in the transmission to change the direction of travel to the reverse speed.

A driven gear 54 is mounted on a shaft 56 adjacent gear unit 30 and reverse idler gear unit 42. Shaft 56 is journaled at 58 in wall 18. Shaft 56 also has gears 60, 62 and 64 mounted thereon, and a pinion gear 66 meshes with and drives gear 68 whenever shaft 56 turns. Gear 68 drives a gear 70 which in turn drives the rear axle gear 72. Gear 72 is fixed on the rear axle which drives the usual traction wheels, not necessary to further disclose. Shaft 56 is journaled at 65 in wall 20.

When gear shift 24 is in the neutral position and the engine is running, an engagement of clutch 14 with the engine crankshaft and flywheel will cause rotation of shaft 16, and also gear unit 30. As seen in FIG. 3, when in the neutral position, gear unit 30 is in a mid position on portion 28 of shaft 16. The reverse idler gear unit 42 is in a rearward position on portion 44 of the shaft 46. The forward portion 32 of gear unit 30 is of a smaller diameter than the rear portion 34, and as seen in FIG. 3, when in the neutral or mid position, the teeth of portion 32 of gear unit 30 do not mesh with the teeth of the forward portion 50 of idler gear unit 42. The rear portion 34 of gear unit 30 is located so that in the neutral position of gear shift 24, the teeth of portion 34 are turning in a space between the two portions of gear unit 42. Gear unit 42 has this portion reduced in diameter so that the said unit 42 will not be turning when gear unit 30 is turning in the neutral position.

Figure 7:
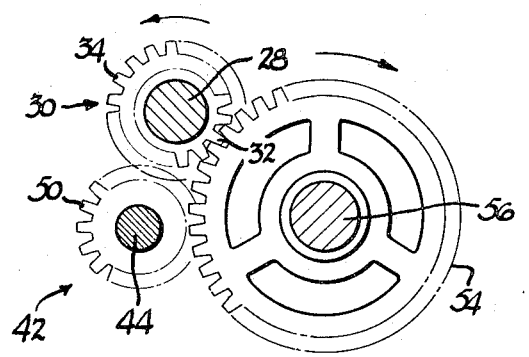
FIG. 7 is a front elevation of the gears showing their direction of rotation in a forward speed position.

When the gear shift lever 24 is positioned for a forward speed, the sliding gear unit 30 is moved forward on the shaft 28 and the teeth of the forward portion 32 are meshed with the teeth of the driven gear 54. As seen in FIG. 7, the sliding gear unit 30 is turning in a counterclockwise direction, and the meshing of the sliding gear teeth with the teeth of the driven gear 54 causes the driven gear to turn in a clockwise direction. This direction of rotation is then transmitted to the pinion gear and to the rear axle drive, thus driving the tractor in a forward direction of travel.

Figure 8:
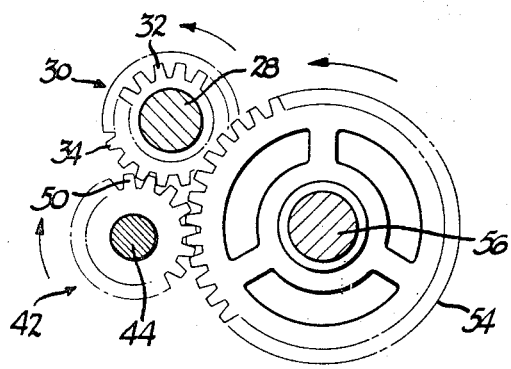
FIG. 8 is a front elevation similar to FIG. 7, showing the direction of rotation of the gears in a reverse speed position.

When shift lever 24 is moved into a position for reverse direction of travel, the gears are arranged as shown in FIGS. 5 and 8. When shifting into the reverse position, sliding gear unit 30 is in its mid position on the shaft portion 28, and the gear portion 32 is clear of driven gear 54. The reverse idler gear unit 42 is then moved forward on the shaft so that the teeth of the rear portion 52 of gear unit 42 engage with the teeth of the rear portion 34 of sliding gear unit 30, and the teeth of the forward portion 50 of idler gear unit 42 mesh with the teeth of the driven gear 54. As shown in FIG. 8, the sliding gear unit 30 is turning in a counterclockwise direction, and the meshing of the sliding gear teeth with the teeth of the reverse idler gear turns the idler gear 42 in a clockwise direction. The meshing of the idler gear teeth with the driven gear teeth turns the driven gear in a counterclockwise direction, thus moving the tractor in a reverse direction of travel.

However, there may be difficulty when starting to shift into position for reverse speed, as the teeth of rear portion 52 of the reverse idler may not mesh with the teeth of portion 34 of sliding gear 30. Sliding gear 30 can then be turned to a new position, by momentarily clutching, so that these teeth properly mesh. It will be noted from FIG. 4, that in this situation, the rear portion of idler gear unit 42 is located so as to engage the rear portion of sliding gear unit 30, before the forward portion 50 of the reverse idler gear unit 42 engages and meshes with the driven gear 54. This construction of the sliding gear unit 30 and the idler gear unit 42 is such that the idler gear can be rotated by the sliding gear when moved forward, and this motion will insure that the idler gear will mesh with the driven gear. This relation will insure that sliding gear unit 30 will not inadvertently be pushed forward on its shaft, by idler gear unit 42, and thus cause a double engagement or meshing of the gears in both a forward and a reverse speed position at the same time.

The momentary clutching to permit meshing of the sliding gear unit, the reverse idler, and the driven gear units tends to prevent such double engagement; however, lacking any specific means to prevent it, such double engagement is still a possibility. The manner in which the double engagement is positively prevented will now be explained.

As stated above, the shift lever 24 extends through cover plate 22, and into the transmission case where the lever is in position to engage and connect to any one of a number of shift forks 76, 78, and 80 (see FIGS. 9-11) which forks extend to the several sliding gears. Shift forks 76, 78 and 80 have notches 81, 83 and 85 respectively for engagement with ball portion 25, as will appear. The sliding gear units and the reverse idler gear unit are constructed to receive the shift forks in a position so that when the shift lever is moved, the forks are moved and in turn cause the gear units to slide back and forth on their respective shafts. The upper parts of the shift forks are fixed respectively in relation to a number of shift rails 82, 84 and 88. Shift rail 86 is used for an auxiliary speed change which is not a part of this invention, and need not be further disclosed, except to point out that it is located, in the embodiment disclosed, between rails 84 and 88 so as to space them apart an appreciable distance, and thereby illustrates certain advantages of the present interlock mechanism.

A front bracket 90 and a rear bracket 92 are supported from the top of the transmission case and extend downwardly toward the gears inside the case. The shift rails are slidably supported in the front and rear brackets as shown in FIGS. 3 and 5. The front brackets 90 has a bore 94, a retaining spring 96 and a detent ball 98 above each shift rail to yieldably hold the rail in a desired position. Each shift rail has a first groove or recess 100 and a second groove or recess 101. Shift rails 84 and 88 also have a third groove 103. Detent ball 98 is positioned and pressed into groove 100 by one of the retaining springs 96 to hold the shift rail 82 yieldably in position when the shift lever is in neutral. The detent ball 98 is positioned in groove 101 of shift rail 82 for reverse speed position. Grooves 100 and 103 in shift rails 84 and 88 are used when driving in a forward speed, whereas groove 101 in rails 84 and 88 is for the neutral position.

Figure 9:
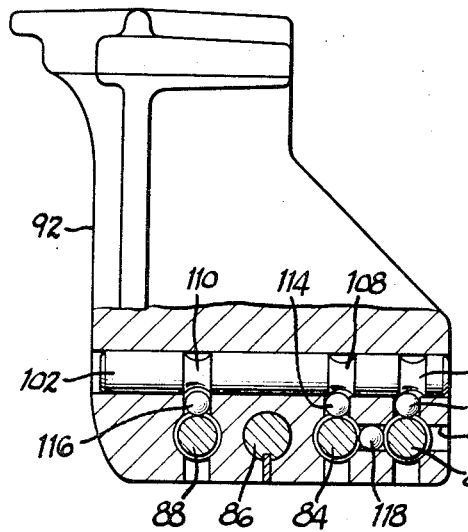
FIG. 9 is an enlarged sectional view of the shift rails taken along the line 9—9 of FIG. 3.
Figure 10:
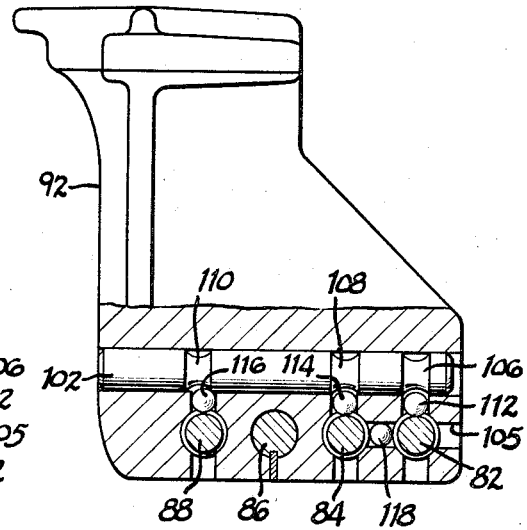
FIG. 10 is a similar view of the shift rails with the parts in a different position.
Figure 11:
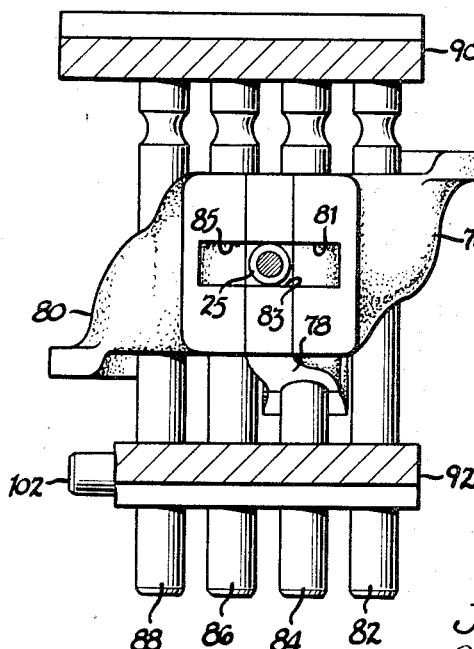
FIG. 11 is a plan view of the shift forks and rails taken along the line 11—11 of FIG. 3.

The rear bracket 92 contains an interlock rail 102 disposed transversely of rails 82, 84, 86 and 88, which can slide a predetermined distance in the direction of its length as shown in FIGS. 9 and 10. The shift rails 82, 84, and 88, as stated above, are slidably supported in bracket 92. Each shift rail has a groove or recess 104 spaced from the end thereof for purposes which will be later described. Interlock rail 102 has grooves or recesses 106, 108 and 110 in which detent balls 112, 114, and 116 are respectively positioned to be forced into the grooves to lock certain rails at desired times.

The construction of the interlocking arrangement for use when shifting into reverse speed position will now be described. The shift lever and, in turn, the transmission gears are always in a neutral position prior to shifting into reverse speed. As seen in FIG. 9, shift rails 82, 84 and 88, balls 112, 114 and 116, and interlock rail 102 are positioned so that any one of the rails is free to move to a different position.

When shifting into reverse speed, the shift lever 24 is tilted toward the left so as to engage ball portion 25 with notch 81, and moved to the rear, rail 82 being moved forward by reason of the lever action. Ball 98 is forcibly raised out of groove 100 against the retaining spring 96, thus allowing rail 82 to move forward when ball 98 is in a position between groove 100 and groove 101.

Assuming the parts in the position shown in FIG. 9, when rail 82 starts to move forward, ball 112 is forced upward out of the shift rail groove 104, and, since groove 106 does not register with ball 112, the upward force is exerted against the interlock rail 102, and rail 102 is then forced to shift to the left as shown in FIG. 10, as a result of ball 112 seeking to get into groove 106 of rail 102. Rail 102 in moving to the left, in view of the position of the groove 110 on rail 102, forces ball 116 into groove 104 of rail 88, so that rail 88 cannot move in either direction. However, rail 84 must also be locked.

As rail 82 moves forward, a ball 118 slidable in a bore 105 is forced out of groove 104 in rail 82 and is pressed into groove 104 of rail 84. Thus rail 84 is held or locked in position so it cannot move in either direction.

As shown in FIG. 10, rail 82 is moved forward to shift into reverse speed, but rails 84 and 88 are locked so that they cannot move. The positions of the balls 114, 116 and 118, and the interlock 102, thus lock rail 88, which rail and its respective fork control the movement of the sliding gear unit 30 and secure it in a disengaged position.

Sliding gear 30 therefore cannot move forward on its shaft when the reverse idler unit 42 is moved forward, which otherwise might result in engagement of both the reverse idler gear unit 42 and the sliding gear unit 30 with the driven gear 54 at the same time.

This possibility is positively prevented by the position of ball 118 between rails 82 and 84 and by the position of ball 116 between rails 88 and 102.

Gear unit 30 cannot be slid forward at the same time that the reverse idler gear unit 42 is moved into position to mesh with the driven gear 42 to drive the tractor in a reverse speed position.

A similar action takes place when the shift lever is moved into position for forward speed operation. Assuming the parts to be in the position shown in FIG. 10, when rail 88 is slid forward or rearward by engagement of shift lever ball portion 25 with notch 85, ball 116 is forced out of groove 104 of rail 88 and into groove 110 of rail 102, thus shifting rail 102. At the same time, balls 112 and 114 are pressed into grooves 104 of rails 82 and 84, by the sliding movement of rail 102. Balls 112 and 114 are now misaligned with grooves 106 and 108, as seen in FIG. 9, and therefore cannot enter grooves 106 and 108. Therefore they cannot escape from grooves 104 of rails 82 and 84, and the latter cannot move. Since ball 116 is pressed into groove 110 of rail 102, rail 102 cannot move, and therefore rails 82 and 84 are locked in position.

When rail 84 is slid forward or rearward by engagement of ball portion 25 with notch 83, ball 114 is forced out of groove 104 by rail 84 and is pressed into groove 108 of rail 102, thus keeping rail 102 from shifting. Ball 116 is pressed into groove 104 of rail 88 and held in that position, and since ball 116 is misaligned with groove 110 of rail 102, rail 88 cannot move. However, ball 112 is in groove 104 of rail 82 and also is aligned with and can be pressed into groove 106 of rail 102, so that rail 82 could slide. To prevent sliding of rail 82 when moving rail 84, ball 118 between rails 82 and 84 is forced out of groove 104 of rail 84 by the sliding movement of rail 84 and is pressed into groove 104 of rail 82. Therefore, rail 82 cannot move when rail 84 is slid forward or rearward.

The operation of the reverse idler drive should be generally apparent from the foregoing description of the construction, but will now be summarized. When the shift lever is in the neutral position, the reverse idler gear is disengaged from the sliding gear and therefore no audible noise emits from the meshing of these gears. When the gear shift is placed in position for reverse speed, the sliding reverse idler gear unit is moved forward on its shaft which requires reengaging it with the sliding gear. The rear portion of the sliding gear unit engages the rear portion of the idler gear unit before the forward portion of the idler gear unit meshes with the driven gear, so that the engagement of the reverse idler gear unit with the driven gear is delayed until the sliding gear unit and the idler gear unit are engaged. In this situation, if the reengagement cannot be properly done because the teeth of the sliding gear do not register with the teeth of the reverse idler gear, the sliding gear can be turned, by engaging the clutch, to a new position which will allow the reengagement. This operation makes possible the registering of the reverse idler gear with the sliding gear before the reverse idler gear meshes with the driven gear, and also provides for registering of the reverse idler with the driven gear, and helps to prevent the accidental meshing of forward and reverse drive gears at the same time. The action of the interlock rail and the position of the shift rails positively prevent the forward speed rails from shifting when the operator shifts into the reverse position, and also prevent the reverse rail from shifting when the operator shifts into any forward speed.

The interlock rail and the positions of the shift rails and balls also prevent one of the forward speed rails from shifting when the operator shifts the other forward speed rail.

Variations of the gear construction and the interlock arrangement may occur to those skilled in the art, and it is to be understood that the invention is not limited by the embodiment described and illustrated, or in fact in any manner except as defined in the following claims.

What is claimed as new and desired to be secured by Letters Patent of the United States is:

1. In a transmission of the type having a transmission case enclosing said transmission, a drive shaft rotatably supported in said transmission case and having a driving portion, sliding gears mounted on said drive shaft and slidable along said driving portion, said sliding gears including a sliding gear unit, said unit having a first sliding gear, and a second sliding gear rearwardly of and united with and spaced from said first sliding gear, a reverse idler gear shaft supported in said transmission case, a reverse idler gear unit, said unit having a first idler gear mounted on said reverse idler gear shaft and a second idler gear rearwardly of and united with and spaced from said first idler gear, said second idler gear being positioned to mesh with said second sliding gear, a countershaft rotatably supported in said transmission case, and a driven gear rotatably supported on said countershaft, said first sliding gear being positioned to mesh with said driven gear in the forward drive position and said first idler gear being positioned to mesh with said driven gear in the reverse drive position, said sliding gears being so positioned in relation to said driven gear and to said first and said second idler gears that, when shifting into the reverse drive position, said second idler gear meshes with said second sliding gear prior to the meshing of said first idler gear with said driven gear, so that said idler gears may be turned by rotation of said second sliding gear to bring said first idler gear into position to mesh with said driven gear.

2. In a transmission of the type having a transmission case, a cover plate attached to the top of said case, a shift lever supported from and extending through said plate, a shifter portion attached to said lever within said case, a bracket supported from said case, said bracket being within said case, a plurality of shift forks, said shifter portion being positioned to engage said shift forks, a plurality of shift rails slidable in said bracket, said forks being supported from certain of said rails, said rails being laterally spaced from each other and having recesses, ball means in said recesses greater than the space between one plane surface of one rail and the plane surface of an adjacent rail, and said bracket providing rail means transversely of and spaced from said shift rails for restricting movement of said ball means to a direction in and out of said recesses, said ball means being positioned to be moved out of one recess by movement of one of said shift rails and said rail means into a desired position, and into the other recess to thereby prevent shifting of the other shift rail.

3. A reverse drive interlock for a transmission having a transmission case, sliding gears and an idler gear, a cover plate attached to the top of said case, a shift lever supported from and extending through said plate, a shifter portion attached to said shift lever, and a plurality of shift forks engaging said shifter portion for moving said sliding gears and said idler gear, said interlock including a bracket attached to said cover plate within said case, a first shift rail and a second shift rail, said first and said second shift rails being supported laterally from each other, an interlock rail located transversely of said shift rails, said bracket supporting said shift rails and said interlock rail, shaped grooves around the circumference of said shift and interlock rails, said bracket providing a plurality of bores each extending from one of said grooves in one shift rail to one of said grooves in said interlock rail, and providing a bore extending from one shift rail to another shift rail, and a plurality of balls, said balls being positioned in said bores to move in and out of said grooves and said bores being so spaced that shifting of said first shift rail will displace one of said balls and said interlock rail to move another ball into position to block shifting of said second shift rail.

4. A reverse idler drive interlock for a transmission of the type having a transmission case, sliding gears and an idler gear, within the transmission case, a cover plate atop said case, a shift lever extending through said plate, a shifter portion on said shift lever, forward shift rails and forks positioned to be engaged by said shifter portion, connected with said sliding gears and slidable, by reason of shifting of said shifter portion, in the same general direction as said sliding gears, and a reverse shift rail and fork positioned to be engaged by said shifter portion connected with said idler gear and slidable, by reason of shifting of said shifter portion, in the same general direction as said idler gear, said interlock including a slidable rail disposed transversely and spaced laterally of said shift rails, a first cam means engaged between said reverse shift rail and said slidable rail to shift said slidable rail by reason of shifting of said reverse shift rail, one of said forward shift rails being spaced laterally from said reverse shift rail and from said slidable rail, and a second cam means engaged between one of said forward shift rails and said slidable rail, said cam means being so shaped that shifting of one of said shift rails will displace one of said cam means and said slidable rail to move the other cam means into position to block shifting of the other shift rail.

5. A reverse idler drive interlock for a transmission of the type having a transmission case, sliding gears and an idler gear within the case, a cover plate atop said case, a shift lever extending through said plate, a shifter portion on said shift lever, forward shift rails and forks connected with said sliding gears and slidable in the same general direction as said sliding gears, said shift rails providing ball receiving recesses, and a reverse shift rail and fork connected with said idler gear and slidable in the same general direction as said idler gear, said reverse shift rail providing a ball receiving recess, said interlock including a slidable rail disposed transversely, spaced laterally of said shift rails and providing a plurality of ball receiving recesses, means providing a bore extending between one of said forward shift rails and said slidable rail and a bore extending between said reverse shift rail and said slidable rail, a first ball in one of said bores engaged between said reverse shift rail and said slidable rail to shift said slidable rail by reason of shifting of said reverse shift rail, one of said forward shift rails being spaced laterally from said reverse shift rail and from said slidable rail, and a second ball in the other of said bores engaged between the last-mentioned forward shift rail and said slidable rail, said recesses being so disposed and so shaped that shifting of one of said shift rails will displace one of said balls and said slidable rail to move the other ball into position to block shifting of the other shift rail.

6. In a tractor of the type having an engine and traction means, a power output element extending from said engine, a transmission connected between said output element and said traction means, said transmission including a cover plate, driving and driven gears, a gear shifting lever extending through the cover plate, gear selective forks actuated by said shifting lever, for selectively engaging said gears and moving said gears from a neutral to a forward or a reverse drive position, a reverse idler drive and interlock mechanism comprising a first sliding gear supported on said output element, a second sliding gear supported on said element and united with said first sliding gear, a first idler gear rotatably supported in said case, a second idler gear rotatably supported and united with said first idler gear, said second idler gear being connected in spaced relationship to said first idler gear and positioned to mesh with said second sliding gear, a driven gear connected in driving relation to said traction means, rotatably supported in position to be engaged by said first idler gear in one position thereof, and by said first sliding gear in one position thereof, a plurality of shift rails spaced laterally of each other and supported so as to be moved longitudinally for selectively engaging said gears by reason of operating said gear shifting lever, an interlock rail located transversely of and spaced from said shift rails, a plurality of recesses at spaced intervals in said shift and interlock rails, said transmission having means providing a plurality of bores connecting selected recesses of said shift rails with those of said interlock rail, and a bore connecting a recess of one shift rail with another shift rail, and a plurality of balls in said bores, said balls being greater than the space between one plane surface of one rail and the plane surface of an adjacent rail, and said balls being positioned to move in and out of said recesses in said shift rails and in said interlock rail so as to prevent said sliding gears from being pushed out of position as said reverse idler gears are shifted from one position to another position.

References Cited

UNITED STATES PATENTS

| | | | |
|---|---|---|---|
| 1,871,014 | 8/1932 | Simpson | 74—58 |
| 2,512,036 | 6/1950 | Orr | 74—477 |
| 2,637,221 | 5/1953 | Backus et al. | 74—477 |
| 2,847,871 | 8/1958 | Schick | 74—477 |
| 2,932,212 | 4/1960 | Herr | 74—477 |
| 2,953,943 | 9/1960 | Arnold | 74—342 |

FRED C. MATTERN, JR., *Primary Examiner.*

DAVID J. WILLIAMOWSKY, *Examiner.*

C. J. HUSAR, *Assistant Examiner.*